Feb. 3, 1970  H. W. DEMUTH  3,493,323
METHOD AND APPARATUS FOR STERILIZING THE AIR
DUCTS OF AIR-CONDITIONING SYSTEMS
Filed Oct. 27, 1966
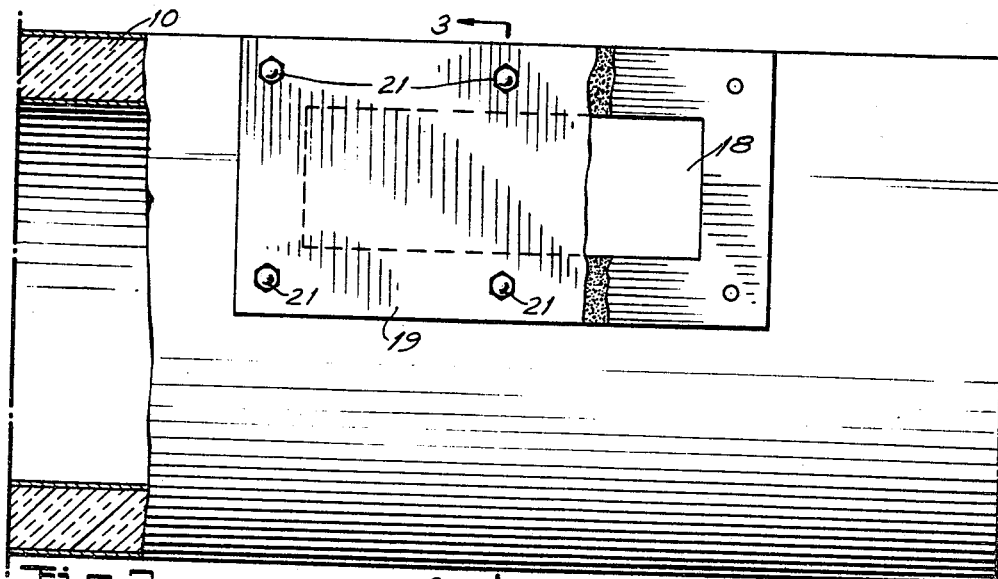
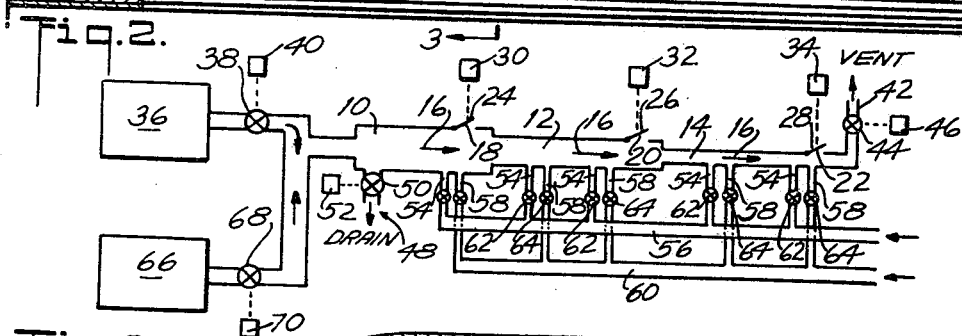
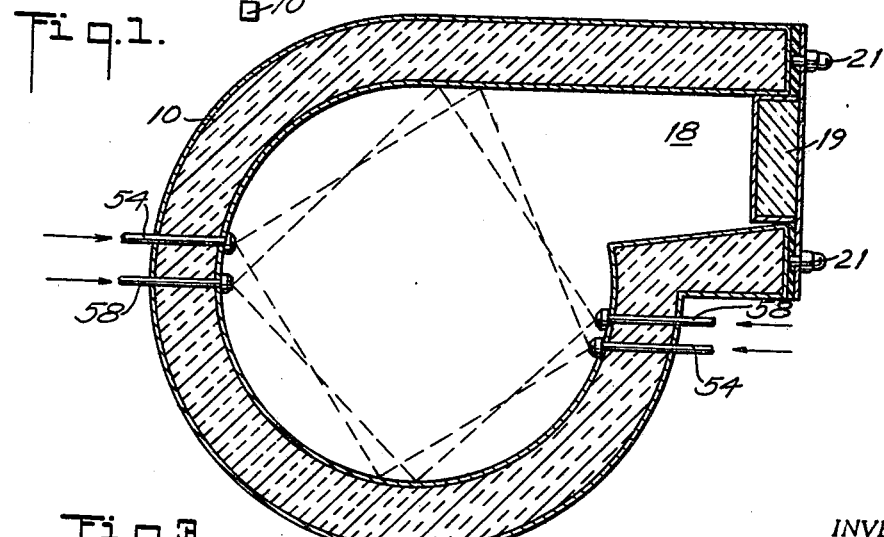
INVENTOR.
HERBERT W. DEMUTH
BY
ATTORNEYS

United States Patent Office 3,493,323
Patented Feb. 3, 1970

3,493,323
METHOD AND APPARATUS FOR STERILIZING THE AIR DUCTS OF AIR-CONDITIONING SYSTEMS
Herbert W. Demuth, Garden City, N.Y., assignor to The Demuth Development Corporation, Garden City, N.Y., a corporation of New York
Filed Oct. 27, 1966, Ser. No. 589,981
Int. Cl. A61l 1/00, 9/00
U.S. Cl. 21—2
22 Claims

ABSTRACT OF THE DISCLOSURE

Method and apparatus for sterilizing elongated air ducts in an air-conditioning system including spray means for impinging jets of spray on all inside surfaces of the ducts, and a supply source for a sterilizing agent and means for connecting it to the spray means. In addition, there are provided a supply source for hot fluid, means for connecting it to the spray means, and valve means for controlling the flow of fluid through the spray means.

---

The invention relates to air-conditioning systems and more particularly to method and apparatus for sterilizing air ducts in air-conditioning systems.

The air-conditioning system according to the invention is particularly adapted among other possible uses, for use in the pharmaceutical industry. It also finds wide application in clean rooms, hospitals, and other indoor public gathering places.

Heretofore bactericidal liquid vapors have been applied to the inside of ducts to purify the air passing through the duct. These systems have been characterized by baffles, or the like, to insure complete mixture of the air and chemical. This invention is not concerned with purifying the air, but applies to the treatment of the duct surfaces per se. That is, the invention pertains to the cleaning or sterilizing of the inside surfaces of the ducts themselves. Further, difficulty has been experienced in attempting to remove particulate material disposed in the duct system. Attempts have been made to blow the material out, but this has not proven very satisfactory. An object of this invention is to effectively remove such foreign particulate material.

In brief, the present invention is concerned with a new and improved process for sterilizing air ducts in air conditioning systems comprising the steps of spraying a sterilizing agent into the air ducts and allowing said sterilizing agent to remain in the air ducts for a predetermined dwell period. The sterilizing agent may be any suitable agent which prohibits the growth and reproduction of undesirable organisms. That is, the agent must be toxic to virus, bacteria, molds, fungi and phage, but not toxic to humans. Triethylene glycol has been found to be highly desirable for this application, for example. The next step in the process according to this invention is to spray hot fluid such as steam or hot water, for example, into the air ducts, allowing said hot fluid to remain in said air ducts for a predetermined dwell period, and then draining the ducts.

In another form of the invention there is provided new and improved apparatus for carrying out the process hereinbefore described including an air duct of an air-conditioning system leading to various areas to be air conditioned and including air distribution openings in said areas. The apparatus further includes a plurality of spray means disposed so that jets of spray therefrom impinge on the inside surfaces of the ducts, a supply source of a sterilizing agent, and means connecting said supply source to said spray means. Also, the apparatus includes a supply source of hot fluid such as hot water or steam, for example, and means connecting the hot fluid supply source to said spray means, valve means for controlling the flow of fluid through the spray means, and drain means.

A feature of the invention resides in the provision of new and improved method and apparatus for effectively removing particulate matter and sterilizing the air ducts in air conditioning systems.

According to the present invention, as another feature thereof, there is provided a method and apparatus for sterilizing air ducts in an air conditioning system which is efficient and convenient, and which is reliable and safe in operation.

Still another feature of the invention resides in the provision of new and improved method and apparatus for sterilizing air ducts in an air-conditioning system which is of simple and practical construction, which is relatively inexpensive to manufacture, and which is otherwise well suited for its intended purpose.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as the basis for the designing of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings, forming a part of the specification wherein:

FIG. 1 is a schematic view of an air-conditioning system constructed according to the concepts of the invention;

FIG. 2 is a plan view, partially in horizontal section, of an air duct; and

FIG. 3 is a transverse sectional view taken along the line 3—3 of FIG. 2 and showing in detail the spray means.

In the illustrated embodiment of the invention and with particular reference to FIG. 1, the air-conditioning system includes round air ducts 10, 12 and 14 of decreasing duct size, respectively, in the direction of air flow, the direction of air flow being indicated by the arrows 16 in FIG. 1. The size graduation of the air ducts is for the purpose of maintaining constant air flow velocity therethrough. As best seen in FIGS. 2 and 3, the ducts are double-wall stainless steel with insulation therebetween.

Still referring to FIG. 1, each of the ducts 10, 12 and 14 lead to various areas which are to be air conditioned and air distribution openings 18, 20 and 22 are provided in each of the areas, respectively. Fluid-tight closure means, such as valves 24, 26 and 28 are provided for each of the openings, 18, 20 and 22, respectively, and each of the valves are operable by motors 30, 32 and 34, respectively. Alternatively, as best seen in FIGS. 2 and 3, the distribution openings, such as opening 18, may be covered by means of an insulated gasket 19 secured to the duct by studs and cap nuts 21. When the insulated gasket 19 is removed, an air distributional grill may be installed in place thereof (not shown). Conditioned air enters the system from a supply source 36, FIG. 1, through a control valve 38, operated by motor 40. The conditioned air may be cold in the summer and warm in the winter as well as being dehumidified or humidified, as desired.

As best seen in FIG. 1, the system further comprises a vent line 42 having a vent valve 44 operable by motor 46. Also, the system has a drain line 48, having a drain valve 50 operable by motor 52. It will be appreciated that the ducts 10, 12 and 14 besides being graduated in size are also disposed with a pitch towards the drain so that fluid contained therein will flow towards the drain line.

Still referring to FIG. 1, the system further comprises a plurality of jet nozzles 54 which are supplied from a manifold 56 with a sterilizing agent such as triethylene glycol, for example. Also a plurality of jet nozzels 58 are provided which are supplied from a manifold 60 with hot water or steam. Valves 62 and 64 control nozzles 54 and 58, respectively. It will be appreciated that the nozzles 54 and 58 are so disposed around the duct that the jets of spray therefrom impinge on all inside surfaces of the ducts, as best seen in FIG. 3.

The system includes a dry-off heater 66, FIG. 1, which supplies the system with hot air. This is controlled by valve 68 which is operable by motor 70, and serves to dry the duct system prior to being placed in normal operation.

Prior to the entry of the air-conditioned air or periodically during the normal operation of the system, the air flow ducts are sterilized. That is, the passages through which the air flows are sterilized but the air itself is not sterilized. To perform this function, valve 38 is closed to shut off the inflow of conditioned air. Distribution openings 18, 20 and 22 are closed by means of valves 24, 26 and 28, respectively. Also, the vent valve 44 and drain valve 50 are moved to their closed positions. Valves 62 are opened to supply the jet nozzles 54 with a sterilizing agent such as triethylene glycol. Preferably the triethylene glycol will be at a temperature of about 75 degrees F. and the spray period will be about ½ minute. Then the nozzle valves 62 will be closed and the triethylene glycol will remain in the ducts for a dwell period of about 30 minutes. Thereafter valves 64 are opened to allow the entrance of either hot water at a pressure of about 15 p.s.i.g. and at a minimum temperature of about 180 degrees F., or steam at a minimum temperature of about 212 degrees F. The dwell period in the ducts for the steam or hot water is between about 15 minutes minimum and about 30 minutes maximum. Then the drain and vent valves 50 and 44, respectively, are opened to allow the fluids to leave the ducts. Thereafter, valve 68 is opened to allow hot air to enter the ducts for drying purposes. Thus, it will be appreciated that the total inside surface of the duct system has been treated and any particulate matter residing therein has been removed. Upon closure of the valve 68, the drain valve 50, the vent valve 44, and upon opening of the dispersing valves 24, 26 and 28, the system is ready to operate on its air conditioning cycle.

From the foregoing description, it will be seen that the present invention contributes a new and improved method and apparatus for sterilizing air ducts in air-conditioning systems which embodies all of the desirable features set forth hereinbefore.

Although certain particular embodiments of the invention are herein disclosed for purposes of explanation, further modifications thereof, after study of this specification, will be apparent to those skilled in the art to which the invention pertains. Reference accordingly should be had to the appended claims in determining the scope of the invention.

What is claimed and desired to be secured by Letters Patent is:

1. A process for sterlizing elongated air ducts in an air-conditioning system comprising the steps of spraying a sterilizing agent from a plurality of nozzles spaced throughout said ducts to spray directly from the nozzles onto all inside surfaces of said air ducts, allowing said sterilizing agent to remain in the air ducts a predetermined dwell period, spraying hot fluid from a plurality of nozzles spaced throughout said ducts to spray directly from the nozzles onto all inside surfaces of said ducts, allowing said hot fluid to remain in the ducts for a predetermined dwell period, and draining said ducts.

2. A process for sterilizing air ducts in an air-conditioning system according to claim 1 wherein said hot fluid is steam.

3. A process for sterilizing air ducts in an air-conditioning system according to claim 1 wherein said dwell period of the hot fluid is not less than about 15 minutes.

4. A process for sterilizing air ducts in an air-conditioning system according to claim 1 wherein said dwell period for the hot fluid is not greater than about 30 minutes.

5. A process for sterilizing air ducts in an air-conditioning system according to claim 1 wherein said dwell period of the hot fluid is between about 15 minutes and about 30 minutes.

6. A process for sterilizing air ducts in an air-conditioning system according to claim 1 wherein said spray period of said sterilizing agent is about ½ minute.

7. A process for sterilizing air ducts in an air-conditioning system according to claim 1 wherein said dwell period for the sterilizing agent is about 30 minutes.

8. A process for sterilizing air ducts in an air-conditioning system according to claim 1 wherein said hot fluid is steam at a minimum temperature of about 212 degrees F., said dwell period for the steam being not less than about 15 minutes, and not greater than about 30 minutes, and wherein said sterilizing agent is triethylene glycol at a temperature of about 75 degrees F., and wherein the spray period of said triethylene glycol is about ½ minute, and the dwell period for said triethylene glycol is about 30 minutes, said process further comprising the step of applying dry-off heat to the inside of said air ducts subsequent to the draining step.

9. A process for sterilizing air ducts in an air-conditioning system according to claim 1 wherein said sterilizing agent is triethylene glycol.

10. A process for sterilizing air ducts in an air-conditioning system according to claim 9 wherein the temperature of said triethylene glycol is about 75 degrees F.

11. A process for sterilizing air ducts in an air-conditioning system according to claim 1 wherein said hot fluid is hot water.

12. A process for sterilizing air ducts in an air-conditioning system according to claim 11 wherein said hot water has a minimum temperature of about 180 degrees F.

13. A process for sterilizing air ducts in an air-conditioning system according to claim 11 wherein said hot water is sprayed into said ducts under a pressure of about 15 p.s.i.g.

14. A process for sterilizing elongated air ducts in an air-conditioning system comprising the steps of spraying triethylene glycol at a temperature of about 75 degrees F. for a period of about ½ minute from a plurality of nozzles spaced throughout said ducts to spray directly from the nozzles onto all inside surfaces of said air ducts, allowing said triethylene glycol to remain in the air ducts for about 30 minutes, spraying hot fluid from a plurality of nozzles spaced throughout said ducts to spray directly from the nozzles onto all inside surfaces of said ducts, allowing said hot fluid to remain in the ducts for a predetermined dwell period, and draining said ducts and applying dry-off heat to the inside of said air ducts.

15. In an air-conditioning system having air ducts leading to various areas to be air conditioned and air distribution openings in said air ducts in said areas, sterilization apparatus comprising a plurality of spray nozzles disposed in spaced relationship throughout said air ducts so that jets of spray therefrom spray directly onto all inside surfaces of said ducts, a supply source of a sterilizing agent, means connecting said supply source to said spray nozzles, a supply source for hot fluid, means connecting said hot fluid supply source to said spray nozzles, and valve means for controlling the flow of fluid through said spray nozzles.

16. Sterilizing apparatus according to claim 15 further comprising means for draining said ducts.

17. Sterilizing apparatus according to claim 15 further comprising a vent duct disposed toward one end of said air-conditioning system.

18. Sterilizing apparatus according to claim 15 further comprising closure means for said openings.

19. In an air-conditioning system having air ducts leading to various areas to be air conditioned and air distribution openings in said air ducts in said areas, sterilzation apparatus comprising a plurality of spray means disposed so that jets of spray therefrom impinge on all inside surfaces of said ducts, a supply source of a sterilizing agent, means connecting said supply source to said spray means, a supply source for hot fluid, means connecting said hot fluid supply source to said spray means, and valve means for controlling the flow of fluid through said spray means, and each of said spray means comprising a nozzle for said sterilizing agent and a separate nozzle for said hot fluid.

20. In an air-conditioning system having air ducts leading to various areas to be air conditioned and air distribution openings in said air ducts in said areas, sterilization apparatus comprising a plurality of spray means disposed so that jets of spray therefrom impinge on all inside surfaces of said ducts, a supply source of a sterilizing agent, means connecting said supply source to said spray means, a supply source for hot fluid, means connecting said hot fluid supply source to said spray means, and valve means for controlling the flow of fluid through said spray means, and a dry-off heater disposed in said system.

21. In an air-conditioning system having air ducts leading to various areas to be air conditioned and air distribution openings in said air ducts in said areas, sterilzation apparatus comprising a plurality of spray means disposed so that jets of spray therefrom impinge on all inside surfaces of said ducts, a supply source of a sterilizing agent, means connecting said supply source to said spray means, a supply source for hot fluid, means connecting said hot fluid supply source to said spray means, and valve means for controlling the flow of fluid through said spray means, said air ducts being self-draining by pitch and by decreasing duct size in the direction of the air flow.

22. In an air-conditioning system having air ducts leading to various areas to be air conditioned and air distribution openings in said air ducts in said areas, sterilizaton apparatus comprising a plurality of spray means disposed so that jets of spray therefrom impinge on all inside surfaces of said ducts, a supply source of a sterilizing agent, means connecting said supply source to said spray means, a supply source for hot fluid, means connecting said hot fluid supply source to said spray means, and valve means for controlling the flow of fluid through said spray means, said ducts being self-draining by pitch and by decreasing duct size in the direction of the air flow, said apparatus further comprising a drain duct disposed at the low end of the system, a vent duct disposed towards the other end of the air conditioning system, and wherein each of said spray means comprises a nozzle for said sterilizing agent and a separate nozzle for said hot fluid, and a dry-off heater disposed in said system, said sterilizing apparatus further comprising closure means for said opening.

References Cited

UNITED STATES PATENTS

| | | | |
|---|---|---|---|
| 625,045 | 5/1899 | Macardle | 134—30 XR |
| 1,276,659 | 8/1918 | Jensen. | |
| 2,344,536 | 3/1944 | Coey et al. | 21—57 XR |
| 2,472,011 | 5/1949 | Graham | 21—74 |
| 2,523,373 | 9/1950 | Jennings et al. | 21—53 XR |
| 2,683,074 | 7/1954 | Kuehner | 21—53 |
| 2,936,770 | 5/1960 | Emanuel | 134—199 XR |
| 3,084,076 | 4/1963 | Loucks et al. | 134—30 XR |

MORRIS O. WOLK, Primary Examiner

B. J. RICHMAN, Assistant Examiner

U.S. Cl. X.R.

21—53, 56, 57, 58, 61, 74, 91, 92, 94; 62—303; 134—22, 24, 30, 99, 166; 137—238, 241